United States Patent [19]

Nardi

[11] 4,352,297
[45] Oct. 5, 1982

[54] MECHANISM FOR VARYING THE RELATIVE ANGULAR VELOCITY OF TWO SHAFTS, IN A PROPORTIONALLY CONTINUOUS MANNER

[75] Inventor: Giovanni Nardi, Pisa, Italy

[73] Assignee: Whitehead Motofides S.p.A., Leghorn, Italy

[21] Appl. No.: 50,472

[22] Filed: Jun. 20, 1979

[30] Foreign Application Priority Data

Jul. 5, 1978 [IT] Italy .............................. 68576 A/78

[51] Int. Cl.³ ........................................... F16H 25/04
[52] U.S. Cl. ...................................................... 74/63
[58] Field of Search .............................. 74/63, 65–67

[56] References Cited

U.S. PATENT DOCUMENTS

| | | | |
|---|---|---|---|
| 1,180,952 | 4/1916 | Staude | 74/63 |
| 1,798,722 | 3/1931 | Chalmers | 74/63 |
| 2,364,393 | 12/1944 | Seeck | 74/69 |
| 2,820,369 | 1/1958 | Ingalls | 74/63 |
| 3,420,113 | 1/1969 | Tauscher | 74/63 |
| 3,750,485 | 8/1973 | Blakemore | 74/63 |
| 3,806,014 | 4/1974 | Bolli | 74/63 |

FOREIGN PATENT DOCUMENTS

| | | | |
|---|---|---|---|
| 452614 | 11/1948 | Canada | 74/69 |
| 452065 | 10/1949 | Italy | 74/63 |

Primary Examiner—Lawrence J. Staab
Attorney, Agent, or Firm—Merriam, Marshall & Bicknell

[57] ABSTRACT

A mechanism for varying the relative angular velocity of two shafts (31,32) in a proportionally continuous manner is described. The main feature of this mechanism is to comprise, between said two shafts (31,32), a transmission unit (12) comprising at least one plurality of members (19, 20) rotating about an axis, each of said members (19, 20) being able to establish a connection engagement between one of said two shafts (31,32) and a rotating element (13,14) over a limited extent of rotation of said shaft, the distance of said members from the axis of said one of said two shafts or of said rotating element, when in said connection engagement position, being able to be varied by adjustment means (7) in order to vary the relative angular velocity of said two shafts in a proportionally continuous manner.

6 Claims, 4 Drawing Figures

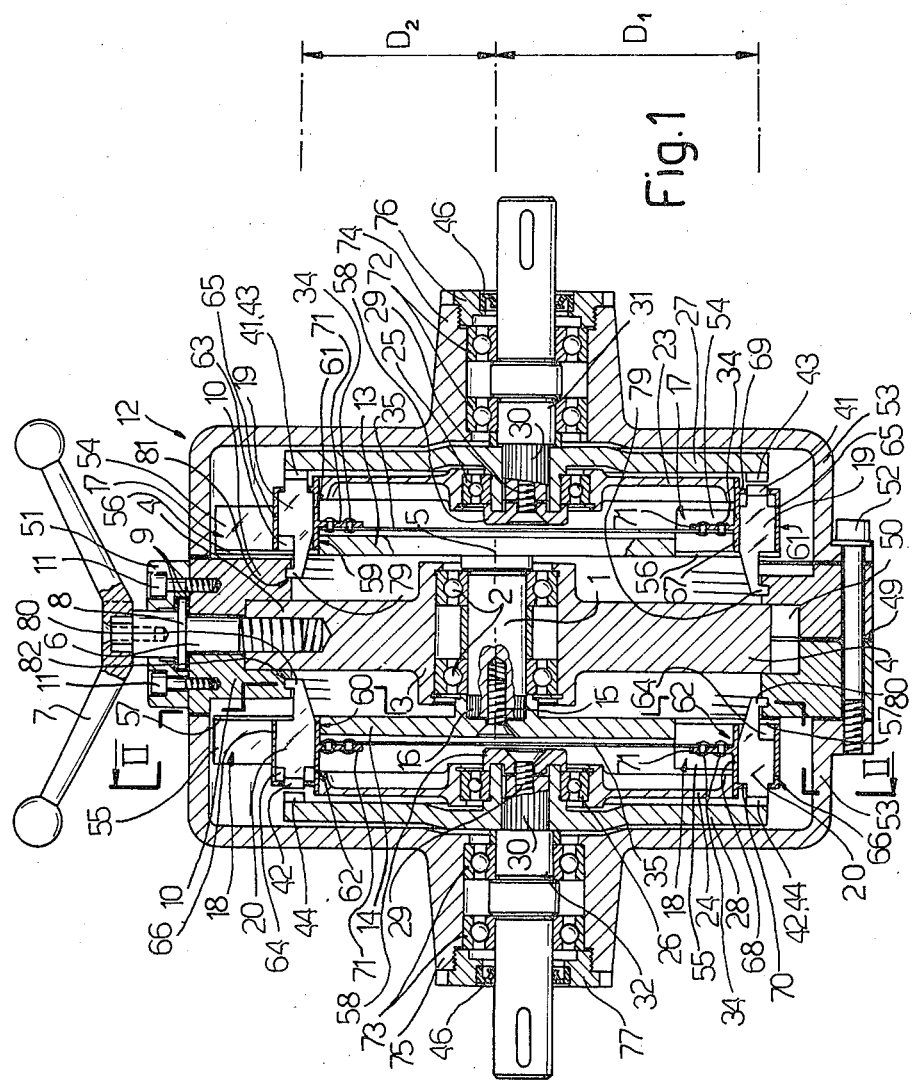

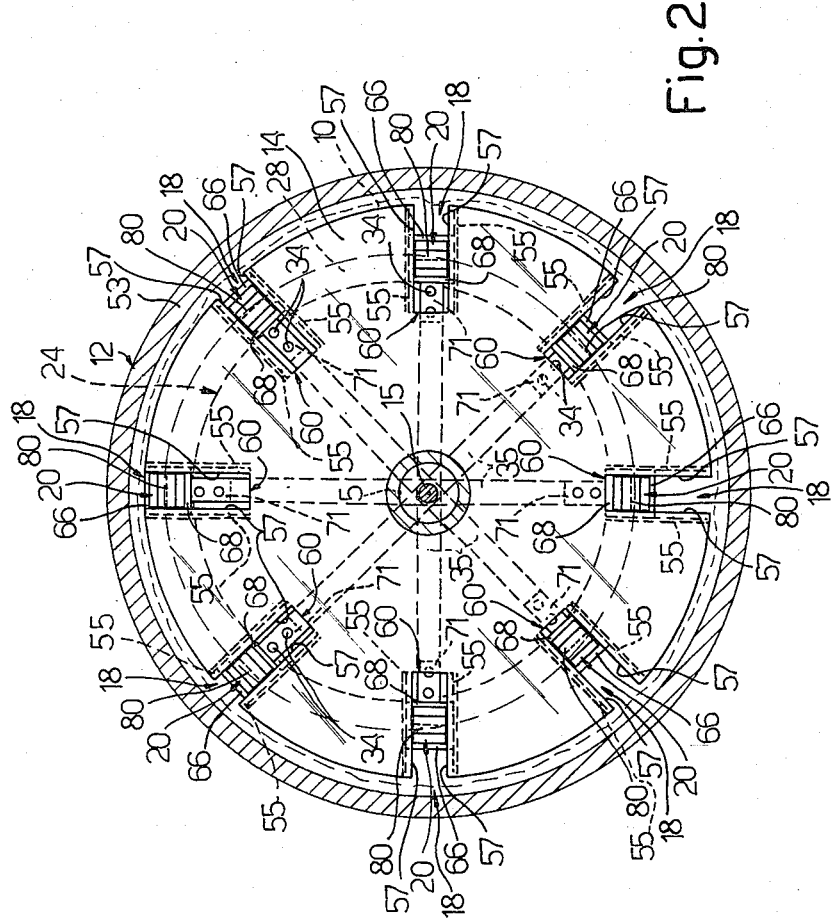

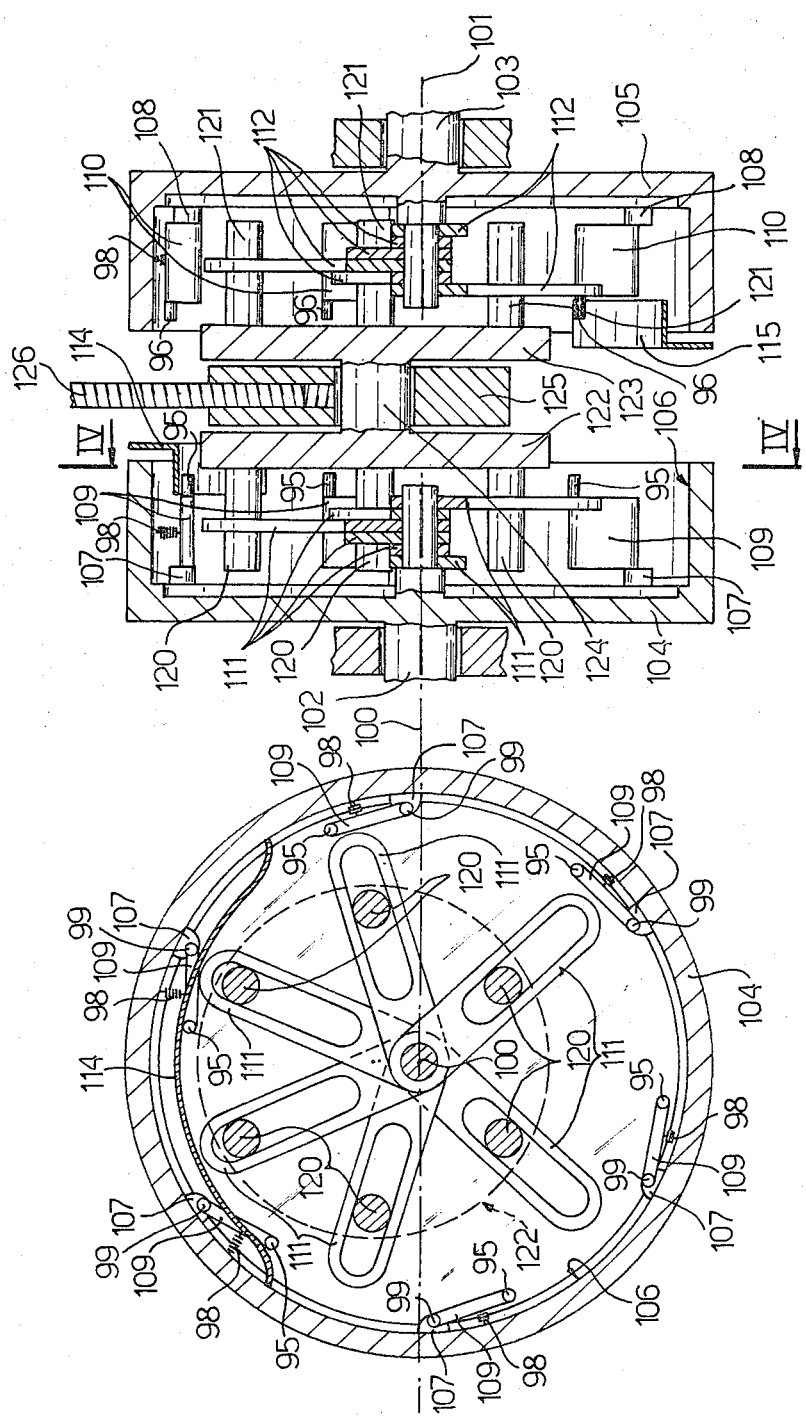

MECHANISM FOR VARYING THE RELATIVE ANGULAR VELOCITY OF TWO SHAFTS, IN A PROPORTIONALLY CONTINUOUS MANNER

BACKGROUND OF THE INVENTION

This invention relates to a mechanism which enables the relative angular velocity of two shafts to be varied in a proportionally continuous manner, and which can be particularly used as a gradual speed change gear.

Mechanisms for carrying out this function are known, but they are not completely satisfactory, either because they do not have a sufficiently high efficiency, or because they are not relatively simple to control etc.

SUMMARY OF THE INVENTION

The object of the present invention is to provide a mechanism for carrying out said function, but which is of completely different construction from known mechanisms, and which does not have the aforesaid drawbacks.

The present invention therefore provides a mechanism for varying the relative angular velocity of two shafts in a proportionally continuous manner, comprising, between said two shafts, a transmission unit comprising at least one plurality of members rotating about an axis, each of said members being able to establish a connection engagement between one of said two shafts and a rotating element over a limited extent of rotation of said shaft, the distance of said members from the axis of said one of said two shafts or of said rotating element, when in said connection engagement position, being able to be varied by adjustment means in order to vary the relative angular velocity of said two shafts in a proportionally continuous manner.

BRIEF DESCRIPTION OF THE DRAWINGS

The present invention will be more apparent from the description given hereinafter by way of example of two embodiments thereof, with reference to the accompanying drawings, in which:

FIG. 1 is a sectional side view through a first embodiment of the mechanism of the invention;

FIG. 2 is a view on the line II—II of the mechanism of FIG. 1, rotated through 180°;

FIG. 3 is a sectional side view through a second embodiment of the mechanism of the invention; and FIG. 4 is a view of the mechanism of FIG. 3, on the line IV—IV.

DETAILED DESCRIPTION OF THE INVENTION

With reference to FIGS. 1 and 2, the mechanism of the invention comprises a shaft, 1, mounted on a pair of bearings 2 fixed in a ring 3 which comprises two prismatic guides 4 extending upwards and downwards from the ring 3.

In the top of the upper prismatic guide 4 is screwed the shank of a screw 6, which is rotated by a handwheel 7 fitted to the top of the screw 6.

A collar 8 is rigid with the screw 6 to prevent any axial movement of said screw 6, and rests on two annular stops 9, which are upper and lower respectively. The lower stop 9 is held against the outer surface of two ring parts 10 which mate along a surface 49 to define between them a compartment 50 housing the end regions of the two prismatic guides 4. The upper stop 9 is held against a cover 51 which is fixed by screws 11 on to the outside of the two parts 10.

The two parts 10 are connected together by bolts 52 which hold the parts 10 between two shell parts 53 forming an outer casing 12 for the complete mechanism.

The shaft 1 carries at its two ends two discs 13 and 14 connected thereto by respective screws 15 and splined coupling regions 16. The discs 13 and 14 comprise towards their periphery a plurality of slide chambers 17 and 18 respectively, for which the major axis is disposed along a radius of the discs 13 and 14.

Each of said chambers 17 or 18 is constituted by two flat walls 54 or 55 respectively, disposed parallel to the major axis of the slide chamber defined thereby, and projecting from one side of the discs 13 or 14. These pairs of walls 54 or 55 each comprise a rim 56 or 57 facing the interior of the chamber 17 or 18 and parallel to the plane of the discs 13 or 14, and also constituting a slide guide. Whereas the peripheral part (with respect to the discs 13 or 14) of the chambers 17 or 18 is open, the inner part is partly closed by a base surface 59 or 60, provided by the disc 13 or 14 itself.

The chambers 17 or 18 are disposed at an equal angle apart on the discs 13 or 14.

Each of the chambers 17 or 18 houses a parallelepiped member 61 or 62 having two lateral walls 63 or 64 which rest, so that they can slide relatively, on the walls 54 and 55, and also having an upper wall 65 or 66 and a lower wall 67 or 68. The rear edges of the walls 65 and 67 or 66 and 68 rest, so that they can slide relatively, on the rims 56 or 57, as in the case of the lateral walls 63 or 64, whereas the front edge of the walls 67 or 68 projects relative to the frame-shaped front wall 69 or 70, of the member 61 or 62.

The lower walls 67 and 68 of the members 61 and 62 each have an appendix 71 to which are fixed, by means of rivets 34, the ends of flat plates 35, each of which is connected at its opposing ends to two appendices 71 of two members 61 or 62 disposed diametrically on said discs 13 or 14.

The lower walls 67 and 68 of the members 61 and 62 also rest on the periphery of respective discs 23 and 24 which are supported by the outer race of respective bearings 25 and 26, the inner race of which is disposed on a hub of respective wheels 27 and 28 which are coupled by way of respective splined parts 30, with respective shafts 31 and 32, the axes of which coincide, and are parallel with the axis 5 of the shaft 1.

At the ends of the shafts 31 and 32, a respective screw 29 locks a cover 58 against the inner race of the bearings 25 and 26, so that the discs 23 and 24 and the wheels 27 and 28 are also axially locked. The shafts 31 and 32 are supported by pairs of bearings 72 and 73 disposed in end regions 74 and 75 of the casing 12, there being screwed into the ends of said regions 74 and 75 threaded bushings 76 and 77 which axially lock the shafts 31 and 32, and also carry oil retaining plugs 46 around the shaft 31 or 32.

The front periphery of the wheels 27 and 28 carries teeth 43 and 44, arranged to engage with a respective tooth 41 or 42 provided on the front end of a respective pawl 19. The pawl 19 or 20 is contained in the respective member 61 or 62, and can only slide along the axis of the discs 13 or 14, for this purpose its dimensions being substantially close to the distance between the lateral walls 63 or 64 and between the upper and lower walls 65 and 67 or 66 and 68 of the members 61 and 62. Its length is less than the length of the walls 65 or 66, and the tooth 41 or 42 projects from the front wall 69 or 70, whereas from the rear wall of the members 61 or 62 there projects a respective appendix 79 or 80 the end of which is bent orthogonally, to engage in respective grooves 81 or 82 provided in the inner surface of the two parts 10.

The grooves 81 and 82 are circular, and lie in respective planes which are parallel but inclined to the plane perpendicular to the axes of the shafts 31 and 32.

FIGS. 3 and 4 show diagrammatically a further embodiment of the mechanism of the present invention. The reference numerals 100 and 101 indicate the axes of respective shafts 102 and 103 which carry, rigid therewith, respective wheels 104 and 105 with an inner surface 106, there being fixed in proximity to the inner perimetrical region therewith a plurality of elements 107 and 108 to which are pivoted a pin 99 contained in one end of a respective flat member 109 and 110, to which is fixed a spring 98, the other end of which is connected to the surface 106 of the wheel 104 or 105. The lower surface of the member 109 or 110 is arranged to engage, with friction, against the upper region of a respective link 111 or 112 which is pivoted on the hub of the shaft 102 or 103 respectively.

As a plurality of elements 107 or 108 are fixed (equidistantly) on the wheels 104 and 105, a corresponding plurality of links 111 or 112 are pivoted on the hub of the shafts 102 or 103.

Towards its other end, each member 109 or 110 comprises a peg 95 or 96 arranged to be engaged, over a certain extent of the rotation of the wheel 104 or 105, by a fixed track 114 or 115 disposed in proximity to the periphery of the wheel 104 or 105, and having an arc length which is slightly greater than the arc between two adjacent links 111 or 112. The two tracks 114 and 115 are disposed in diametrically opposite positions with respect to the wheels 104 and 105.

Each of the links 111 or 112 comprises a slide slot housing a respective peg 120 or 121 of a respective wheel 122 or 123, this pep being able to slide only along the longitudinal axis of the slot. The two wheels 122 and 123 are of equal diameter, and are connected together by a shaft 124, the axis of which is parallel to the axes 100 and 101, and is supported by a member 125 which can be moved, by means of a control rod 126, in the diametrical plane of the tracks 114 and 115 which passes through the axes 100 and 101.

The operation of the described mechanism of the present invention is as follows.

With reference to FIGS. 1 and 2, it will be assumed that the shaft 32 is the inlet shaft, and is driven at an angular speed $w_1$ (constant or variable). The wheel 28 therefore rotates, its teeth 44 being engaged by a single tooth 42 of a single pawl 20 at any time. Because of the engagement of the appendix 80 in the groove 82, the pawls 20 are in this respect subjected to a reciprocating movement along the axis of the wheel 28 and disc 14, which therefore causes only one pawl 20 to engage with the wheel 28 over a limited extent of rotation of the wheel 28, and equal substantially to the angular distance between two successive pawls 20. The pawls 20 are compelled to follow the rotational movements about the axis of the disc 14, as they are enclosed in the member 62 which is engaged in the chamber 18, and transmit the rotation of the wheel 28 to the disc 14 with a rotation arm of $D_1$ with respect to the axis 5 of the shaft 1.

In one complete revolution of the wheel 28, in addition to the reciprocating movement of the pawls 20 in the member 62, as stated, there is also reciprocating sliding of the member 62 relative to the slide chamber 18, and FIG. 2 shows the various relative positions assumed in one revolution.

The rotation of the shaft 1 is therefore transmitted to the disc 13 and from here to the pawl 19 and wheel 27, with a rotation arm of $D_2$ with respect to the axis 5 of the shaft 1, in a manner similar to that previously described. The wheel 27 therefore rotates the shaft 31 at an angular velocity of $w_2$, such that $w_2/w_1$ is equal to $D_2/D_1$ (as the two wheels 27 and 28 are of the same diameter).

To vary the velocity ratio between $w_1$ and $w_2$, the position of shaft 1 is displaced by operating the handwheel 7, which by means of the screw 6 changes the position of the upper prismatic guide 4 so as to insert the lower prismatic guide 4 to a greater or lesser extent into the compartment 50. There is consequently a corresponding variation in the distances $D_1$ and $D_2$ and thus in the velocity ratio.

In the embodiment shown in FIGS. 3 and 4, it will be assumed that the shaft 102 is driven with an angular velocity of $w_1$, with a corresponding rotation of the wheel 104, and when a relative element 107 is brought into contact with the track 114 by way of the peg 95 on its member 109, the member 109 is rotated about the pin 99 against the action of the spring 98, and there is thus a friction engagement between the lower part of the member 109 and the upper region of a corresponding link 111, which is therefore kept rotating substantially at the same velocity as the wheel 104. When the peg 95 of the member 109 reaches the end of the track 114 and is therefore raised by the spring 98 and is no longer able to engage with the link 111, the peg 95 of the next member 109 comes into contact with the beginning of the track 114, and can engage with the next link 111. Over a limited extent of rotation of the wheel 104, there is only a single link 111 which is entrained by the wheel 104, and transmits rotational movement to the respective peg 120. This therefore produces rotation of the wheel 122, and, by way of the shaft 124, also rotation of the wheel 123 which by way of the pegs 121, links 112 and members 110, transmits rotation to the wheel 105 and thus to the shaft 103 which rotates with an angular velocity of $w_2$. As the diameters of the two wheels 122 and 123 are equal, the ratio of the angular velocities of the two shafts 103 and 102 is proportional to $D_3/D_4$, where $D_3$ is equal to the distance between the axis 100 and the peg 120 relative to the link 111 engaged by the member 109, and $D_4$ is equal to the distance between the axis 101 and the peg 120 relative to the link 112 correspondingly engaged by the member 110, in the diametrically opposite position.

Thus again in this case, by varying the position of the shaft 124 by means of the rod 126, by which means it is kept continuously in the diametrical plane of the tracks 114 and 115, the distances $D_3$ and $D_4$ are varied, and thus the velocity ratio between the two shafts 102 and 103 is also varied.

With the described mechanism of the present invention, it is consequently possible to vary the relative angular velocity of two shafts in a proportionally continuous manner extremely simply by the described displacement of the shaft 1 or shaft 124, with a relatively high efficiency and with sufficiently reliable operation ensured.

The described mechanism of the present invention can in particular be used as a speed change gear, preferably for those applications requiring a variation in the velocity ratio over a relatively limited range.

The described mechanism can obviously also be used partially, with a single plurality of pawls or links and utilising the available velocity variation at the shaft 1 or shaft 124. Alternatively, it can be used in combination with other known devices, and in particular with gear boxes, so that the device can give an overall gradual velocity variation over a much wider range, as is required for example in motor vehicle applications.

In particular, the axis of the intermediate shaft 1 or 124 can be displaced in position by any means considered most convenient, i.e. manual or automatic, for example as a function of the value of a resisting torque, or by means of a transducer, the control being mechanical, pneumatic etc.

Finally, it is apparent that in addition to the modifications already described, further numerous modifications can be made both in the form and arrangement of the various parts of the mechanism of the invention, without leaving the scope of the inventive idea contained therein.

For example, it does not matter to which of the two end shafts of the mechanism the motion is applied, and said rotating members of the transmission unit can be constructed in two or more component parts, with the possibility of relative movement between said parts, provided they are able to establish a connection engagement between one of the two shafts and the intermediate rotating element (shaft 1 or 124), and it is not necessary for this connection engagement towards one of the two shafts and towards the intermediate element to lie on the same axis (see for example the embodiment of FIGS. 3 and 4). This connection engagement can be obtained not only by pawls cooperating by engagement or by surfaces cooperating by friction, but also by means of ratchet gears rigid in the direction of the shaft or in the direction of the transmission unit, and caused, for example by means of cams, to engage with the corresponding element over a limited extent of rotation, or by means of other known systems for establishing temporary mechanical connection between one of the shafts and the transmission unit over a limited extent of rotation.

Furthermore, the members which effect the connection engagement can be fixed on the element of the transmission unit, and the connection engagement in the direction of one of said two shafts can be determined by means which cause only one member each time to make a displacement substantially parallel to the axis of said shaft. For example, the element which supports said members can be constructed of a material which partly yields under the action of tracks cooperating with parts of said members.

What we claim is:

1. A mechanism for varying the angular velocity of two rotary shafts relative to one another in a proportionally continuous manner, the mechanism comprising: an element rotatable about an axis of rotation parallel with the axes of rotation of said two shafts and arranged therebetween, and a first and a second plurality of connecting members assembled on opposite sides of said rotatable element; each said connecting member angularly connecting said rotatable element to one of said shafts only when arranged in a limited number of angular connection engagement positions associated with a restricted range of angular positions about said axis of said one of said two shafts; the distance of said members from the axis of said one of said two shafts being constant during rotation, the distance of said members from the axis of said rotatable element being variable during rotation, and the distance of the axis of said rotatable element from the axes of said two shafts being able to be varied, when said members are in said limited number of angular connection engagement positions, by adjustment means in order to vary the relative angular velocity of said two shafts in a proportionally continuous manner; and means for compelling said connecting members to rotate with said rotatable element, including respective cavities provided in said rotatable element for housing respective connecting members, wherein said connecting members, in said respective cavities, can move in directions radial to the axis of the rotatable element, said radial movement being determined by said adjustment means.

2. A mechanism as claimed in claim 1, wherein said connecting members, in said respective cavities, can move in directions parallel to said axis of rotation of said two shafts under the action of means for determining said limited connection engagement between said connecting members and one of said two shafts.

3. A mechanism for varying the angular velocity of two rotary shafts relative to one another in a proportionally continuous manner, the mechanism comprising: an element rotatable about an axis of rotation parallel with the axes of rotation of said two shafts and arranged therebetween, and a first and a second plurality of connecting members assembled on opposite sides of said rotatable element; each said connecting member angularly connecting said rotatable element to one of said shafts only when arranged in a limited number of angular connection engagement positions associated with a restricted range of angular positions about said axis of said one of said two shafts; the distance of said members from the axis of said one of said two shafts being constant during rotation, the distance of said members from the axis of said rotatable element being variable during rotation, and the distance of the axis of said rotatable element from the axes of said two shafts being able to be varied, when said members are in said limited number of angular connection engagement positions, by adjustment means in order to vary the relative angular velocity of said two shafts in a proportionally continuous manner; and means for compelling said connecting members to rotate with said rotatable element, including respective cavities provided in said rotatable element for housing respective connecting members, wherein said connecting members, in said respective cavities, can move in directions parallel to said axes of rotation of said two shafts under the action of means for determining said limited connection engagement between said connecting members and one of said two shafts, said means for determining said limited connecting engagement includes tracks or cams arranged to cooperate with appendices of said connecting members, and wherein said connecting members include a first part arranged to engage with a part rigid with one of said two shafts, and a second part arranged to cooperate with said tracks or cams, each of said connecting members being housed in a slider so that it can slide, in said slider, in said direction parallel with said second axis of rotation, said slider being housed in a respective radial guide in said rotatable element so that it can slide, in said guide, in said direction radial to the axis of said rotatable element, each diametrically opposing pair of sliders being connected together rigidly.

4. A mechanism for varying the angular velocity of two rotary shafts relative to one another in a proportionally continuous manner, the mechanism comprising: an element rotatable about an axis of rotation parallel with the axes of rotation of said two shafts and arranged therebetween, and a first and a second plurality of connecting members assembled on opposite sides of said rotatable element; each said connecting member angularly connecting said rotatable element to one of said shafts only when arranged in a limited number of angular connection engagement positions associated with a restricted range of angular positions about said axis of said one of said two shafts; the distance of said members from the axis of said one of said two shafts being constant during rotation, the distance of said members from the axis of said rotatable element being variable during rotation, and the distance of the axis of said rotatable element from the axes of said two shafts being able to be varied, when said members are in said limited number of angular connection engagement positions, by adjustment means in order to vary the relative angular velocity of said two shafts in a proportionally continuous manner, said rotatable element including cavities for housing respective connecting members, said cavities compelling said connecting members te rotate with said rotatable element.

5. A mechanism as claimed in claim 4, wherein said connecting members, in said respective cavities, can move in directions parallel to said axes of rotation of said two shafts under the action of means for determining said limited connection engagement between said connecting members and one of said two shafts.

6. A mechanism as claimed in 5, wherein said means for determining said connection engagement comprise tracks or cams arranged to cooperate with appendices of said connecting members.

* * * * *